June 21, 1966  H. E. BRYS  3,256,610
FLATNESS GAUGE
Original Filed June 23, 1958  2 Sheets-Sheet 1
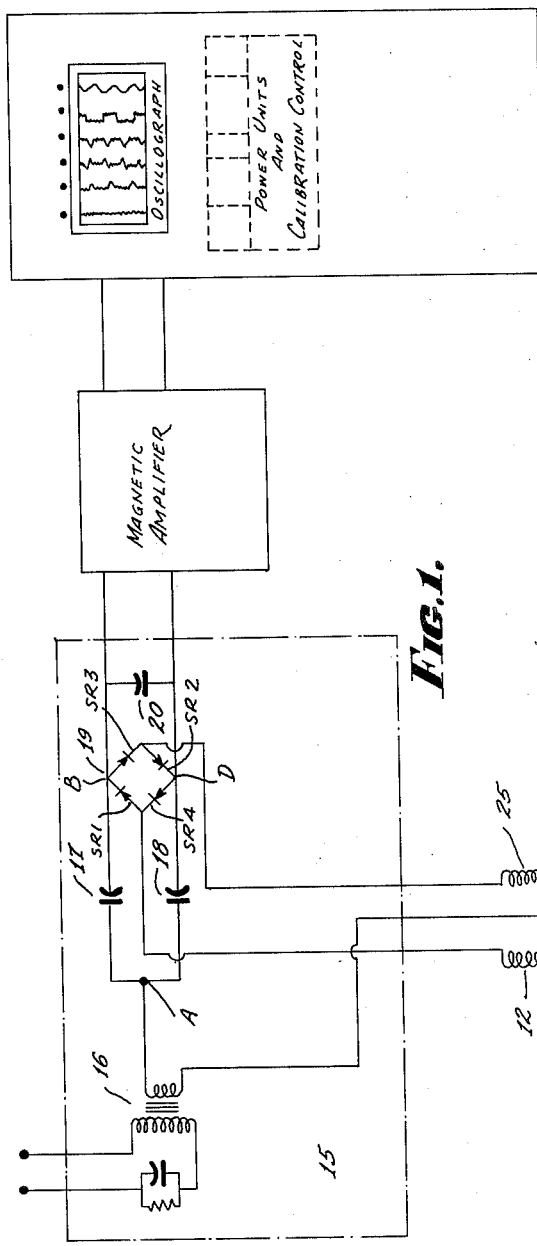
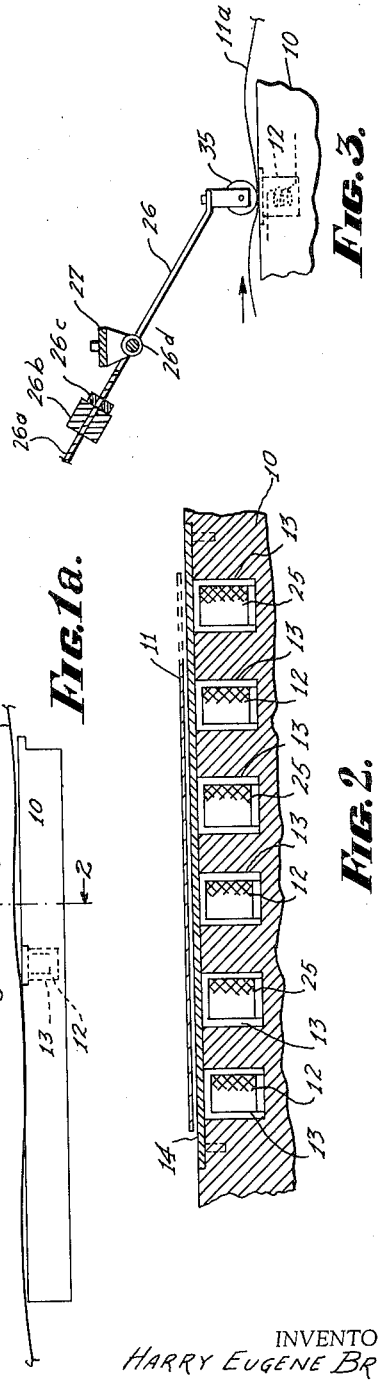
INVENTOR.
HARRY EUGENE BRYS.
BY
ATTORNEYS June 21, 1966  H. E. BRYS  3,256,610
FLATNESS GAUGE
Original Filed June 23, 1958  2 Sheets-Sheet 2
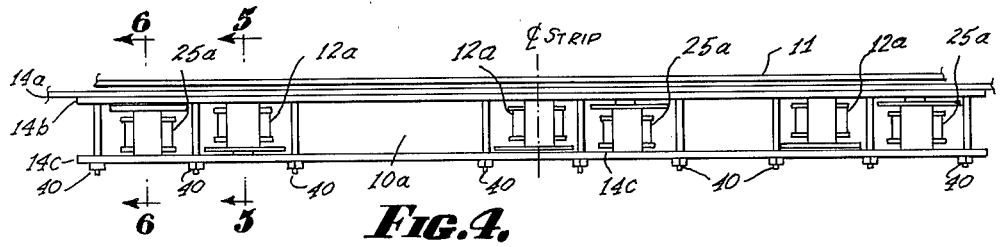
FIG. 4.
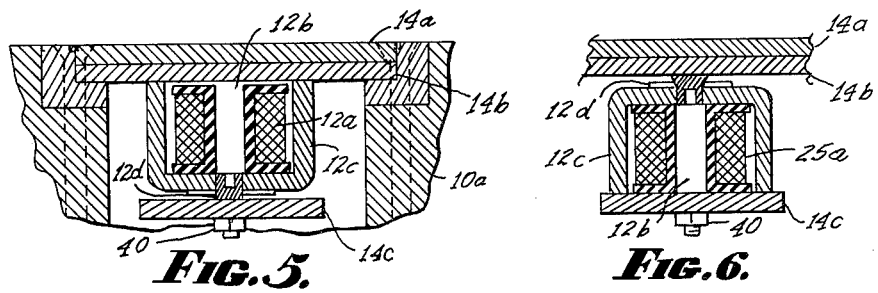
FIG. 5.  FIG. 6.
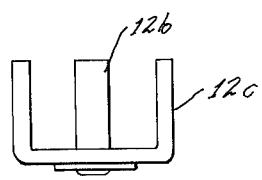  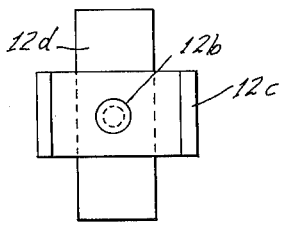
FIG. 7.  FIG. 8.
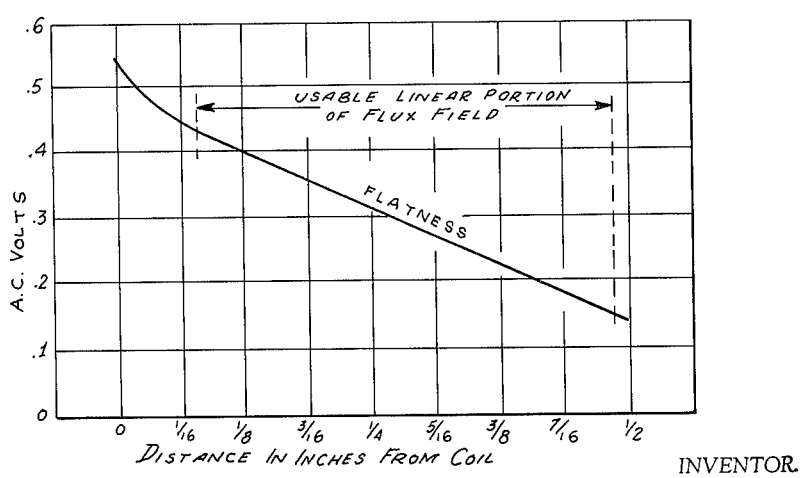
FIG. 9.
INVENTOR.
HARRY EUGENE BRYS,
BY
ATTORNEYS

United States Patent Office 3,256,610
Patented June 21, 1966

3,256,610
FLATNESS GAUGE
Harry Eugene Brys, Butler, Pa., assignor to Armco Steel Corporation, Middletown, Ohio, a corporation of Ohio
Original application June 23, 1958, Ser. No. 743,633, now Patent No. 3,161,824, dated Dec. 15, 1964. Divided and this application July 6, 1964, Ser. No. 380,321
6 Claims. (Cl. 33—172)

This invention relates to a flatness gauge and more particularly to an apparatus for the purpose of measuring the deviation of a body from a standard or arbitrary degree of flatness, and is a division of my copending application Serial No. 743,633, filed June 23, 1958, now Patent No. 3,161,824 dated December 15, 1964, which in turn was a continuation-in-part of my copending application, Serial No. 553,542 filed December 16, 1955, now abandoned. The body may be a sheet, strip, block or the like and in the operation of the apparatus I make use of the quality of magnetic permeability. The apparatus according to the invention is particularly well adapted to the gauging of flatness of metallic strip having some degree of magnetic permeability and it is adaptable to measuring the flatness of so-called non-magnetic materials such as stainless steels and alloys which are generally thought to be non-magnetic but which do possess some degree of permeability which can be employed according to the present invention.

The invention is also adaptable to the measurement of the flatness of materials which possess slight or air permeability. I shall hereinafter disclose a modification wherein for use with materials which actually have air permeability I provide an armature adapted to rest on the material being gauged but in this modification the thickness of the material being gauged will be limited to the flux field of the sensing element and a workable deviation of the armature.

All flatness gauges which have been proposed in the past, and with which I am familiar, have various mechanical parts which are exposed to damage and thus errors and miscalibrations can enter into the readings by accident. Generally such apparatuses involve the direct mechanical displacement of a magnetic core or armature and in addition to the unreliability of such apparatuses, they involve excessive maintenance costs.

It is an object of the present invention to provide an apparatus to measure flatness or deviation from a set or standard degree of flatness, wherein it is possible in most cases to measure flatness without actually contacting the body whose flatness is to be measured and wherein no damage can accrue to the sensing elements. It is another object of the invention to provide a device of the character outlined which will be dependable and maintenance-free in operation and which does not involve mechanical wear. Still another object involves the provision of an apparatus wherein a true zero or base line is established and wherein there will be no drift in calibration.

These and other objects of the invention which will be described in greater detail hereinafter or which will be apparent to one skilled in the art upon reading these specifications, I accomplish by that certain construction and arrangement of parts of which I shall now disclose certain exemplary embodiments.

Reference is made to the drawings forming a part hereof and in which:

FIGURE 1 is a diagram illustrating the invention.
FIGURE 1a is a side elevational view of the testing table.
FIGURE 2 is a fragmentary cross-sectional view through the testing table taken on the line 2—2 of FIGURE 1a on an enlarged scale.

FIGURE 3 is a fragmentary view similar to FIGURE 1 but showing a modification.
FIGURE 4 is a view similar to FIGURE 2 but showing a modification.
FIGURE 5 is a fragmentary cross-sectional view taken on the line 5—5 of FIGURE 4 and on an enlarged scale.
FIGURE 6 is a fragmentary cross-sectional view taken on the line 6—6 of FIGURE 4, also on an enlarged scale.
FIGURE 7 is an elevational view of the yoke member seen in FIGURES 5 and 6.
FIGURE 8 is a bottom plan view of FIGURE 7; and
FIGURE 9 is a graph useful in understanding the principles of the invention.

Briefly, in the practice of my invention, I provide a table over which the material to be tested may pass. The material may be gauged while it is stationary or it may be gauged while in motion. The sensing element or elements are in the form of wound coils and are recessed in suitable recesses in the table. The recesses are covered with a plate of any suitable material having substantially air permeability to maintain the flat surface of the table.

In the practice of my invention, I may use coils having an air core or coils having an iron core. Certain considerations which will be described more in detail hereinafter, must be observed when the coils are provided with an iron core.

Referring in more detail to the drawings, and more particularly to the embodiment of FIGURES 1 to 3 inclusive, the table is indicated generally at 10 and a strip whose flatness is to be gauged is indicated at 11. The coils which constitute the sensing elements are indicated at 12 and they are suitably mounted in recesses 13 in the table 10. The recesses 13 are covered by the plate 14 of any suitable material having substantially air permeability. It will be clear that any desired number of such elements may be employed, depending upon the width of the material to be gauged. I have shown in these drawings a single row of sensing elements, three in number, extending transversely of the strip to be gauged.

The sensing elements 12 consist of coils of air cores and their purpose is to measure the proximity of various areas of the strip 11 without magnetically attracting the strip or drawing it toward the gauging elements.

The numeral 15 indicates a balanced bridge circuit which includes a voltage regulating transformer 16, two condensers 17 and 18, a full wave rectifier 19, and a filtering or damping condenser 20.

A series of coils 25 substantially identical to the coils 12 and equal in number to the number of coils 12, are disposed in alternate recesses in the table 10 so that there is a coil 25 adjacent each coil 12. The coils 25 are compensating coils and their purpose is to neutralize the signal respectively of the coils 12 when no strip is on the table to be tested. The coils 25 are suitably rendered unaffectable by the strip to be tested as by shielding, by being placed at a greater distance, by being placed on a horizontal axis, or in some other well known manner (not shown). Thus, when no strip 11 is on the table 10 to be tested and the machine is energized, the coils 25 respectively neutralize the signals from the coils 12 so that a signal resulting from the coils 12 when a strip is being tested is produced only by the presence of the strip. With this arrangement, temperature compensation is inherent because the coils 12 and 25 are physically located beside each other so that they are affected by the same temperature to the same degree.

The coils 12 and 25 are inductively and resistively balanced, so that an unbalance resulting from displacement of a body having magnetic permeability with respect to the coil 12 will result in an output from the balanced bridge circuit.

It will be understood that each sensing element may have a separate indicating or recording channel or the total or average may be algebraically computed by suitable equipment which does not form a part of the present invention. The output of the bridge circuit may feed a suitable indicating device such as a meter for direct viewing without recording. Of course, the output from the bridge circuit may be connected to a recording instrument but this may require amplification by means of magnetic or electronic amplifying devices. It will also be understood that the output of the bridge circuit may be used to apply corrective measures or to perform other desirable functions such as classification, rejection or signalling by means of devices in the public domain. In FIGURE 1, I have diagrammatically shown the output of the bridge circuit as being amplified and feeding an oscillograph. The oscillograph shows six traces. Three of these correspond to readings from the three coils 12, each of which will have a circuit such as that of FIGURE 1. The remaining three traces may be arranged in known manner to record strip speed, strip gauge and strip tension. It will be found of value in many instances to correlate speed, distance and gauge with flatness at the two edges of the strip and the middle.

The bridge circuit is balanced when there is no permeable material on any sensing element. The zero line of the indicating or recording mechanism representing perfect flatness (or maximum unbalance of the bridge circuit) is attained when the material being gauged is as close as possible to the sensing element. If now the material being gauged deviates from its nearest proximity to the sensing element, the electrical bridge will be moved toward balance and the recording or indicating instrument will be moved away from its zero. The movement away from zero of the instrument is proportional to the deviation of the material being gauged. It will be understood that the circuitry is calibrated in order to obtain desired readings in relation to the mechanical deviation expected. The indicator or the recording instrument may be calibrated to read any desired terms such as percentage, millimeters, one-thousandths of an inch, etc.

Since the operation of the device is based upon mechanical deviation from a sensing coil of a material having some magnetic permeability, it will be clear that modification must be made if it is desired to measure the flatness of material having air permeability or extremely low permeability. Such a modification is shown in FIGURE 3, where an armature 35, which may be in the form of a wheel or which may be supported on wheels, is mounted by means of an arm 26 from a bracket 27 so as to ride freely on the material to be gauged. In this instance, the sensing element senses the proximity of the armature which reflects the deviation of the air permeability material. The armature 35 may of course be adjusted as to pressure or weight in a known manner. One such adjustment is shown in FIGURE 3 where the arm 26 is mounted to the bracket 27 by a ball bearing pivot at 26d and is threaded at 26a. A counterweight 26b is threaded onto the arm 26 so that by turning the counterweight 26b it may be moved along the arm 26. When properly adjusted, its position is fixed by means of a jam nut 26c. It will be understood in the modifications of FIGURE 3 I am limited as to thickness of material to be gauged by the flux field of the sensing element 12 and the workable deviation of the armature 35.

Again in the modification of FIGURE 3, there is no electrical sensing element exposed to mechanical damage. The armature 35 is easily replaceable in the event of damage and is an inexpensive element.

In the modification of FIGURES 4 to 8 inclusive, I have shown the use of coils having iron cores. The structure of the table may again be substantially as described above, at least to the extent that means are provided beneath the table for the mounting of the sensing coils and the compensating coils and that these coils are covered with a material having no permeability to provide a smooth flush surface for the passage of the strip 11 to be tested. In FIGURES 4 and 5 the table is indicated at 10a.

With coils having metallic cores care must be taken that the signals of the sensing coils are completely neutralized just as with coils having air cores. It is desirable particularly in the testing of material having oriented grain structure to concentrate the flux field in the direction of grain orientation. For this purpose the sensing coils 12a having the iron cores 12b are provided with the iron yokes 12c, These serve the function of concentrating the lines of force in the direction of grain orientation of the strip being tested. This is a standard "E" yoke. It will be observed that in FIGURE 5 the sensing coil is shown mounted with the open side of the yoke 12c upwardly. The compensating coil 25a shown in FIGURE 6 is in all respects like the sensing coil 12a except that it will be observed that it is mounted in inverted relation and with the open side of the yoke 12c extending downwardly. 12d indicates a strap by means of which the coil, whether it be 12a or 25a, may be mounted. Parts of the coil are riveted together as shown, and the assembled coils are clamped between the upper plate 14b and lower plate 14c by the bolts 40.

By mounting the compensating coils 25a in inverted position in relation to the coils 12a, they neutralize each other's signal so that when no strip is being tested no signal is derived from the coils 12a and when a strip is being tested the signal derived from the coils 12a is produced only by the spacing between the strip and the coils 12a.

In FIGURE 9, I have shown a graph for a typical installation on which A.C. voltage is plotted against distance in inches from the coil 12a and it will be noted that from a little over one-sixteenth inch up to approximately one-half inch the curve is a straight line. Particularly when working with coils having iron cores, it is important to operate in the flat or linear part of the curve so that the readings in terms of deviations from the flat will be linear. While the distance may be as great as one-half inch, it is preferred that it not exceed three-eighths inch and preferably that it not be less than one-sixteenth inch. An ideal spacing is about one-fourth inch and excellent results can be obtained with this spacing.

It will be understood that the details of the amplifier and the recording or indicating instrument do not constitute a part of the present invention and it is to be understood that in the claims when indicating means are referred to, such means are inclusive of recording means.

It will also be clear that numerous minor modifications may be made without departing from the spirit of the invention and I, therefore, do not intend to limit myself otherwise than as indicated in the claims which follow.

Having now fully described my invention, what I claim as new and desire to secure by Letters Patent is:

1. An apparatus for determining the deviation from an arbitrary degree of flatness of a body comprising a table upon which the body to be examined is located, said table having a plurality of recesses, a set of sensing coils having iron cores and means to concentrate the magnetic flux of said coils in one direction, a set of compensating coils substantially identical to said sensing coils, disposed beside said sensing coils but in inverted position, said coils being disposed in said recesses, a plate of material having substantially air permeability covering said recesses and flush mounted on said table to provide a continuous smooth surface, said coils being inductively and resistively balanced, a balanced bridge circuit including said coils, said sensing coils being disposed at such distance from the body to be examined that the A.C. response is linearly related to the proximity to said sensing coils of an element of said body under examination, whereby the flux field of said sensing coils is affected in proportion to the proximity of said body to said surface to unbalance the bridge circuit proportionately, said bridge circuit having an output, and indicating means connected to said output to indicate the degree of unbalance and therefore the degree of flatness of said body.

2. An apparatus for determining the deviation from an arbitrary degree of flatness of a body, comprising a table upon which the body to be examined is located, said table having a plurality of recesses, a set of sensing coils having iron cores and upwardly open E-shaped iron yokes, to concentrate the magnetic flux of said coils in one direction, a set of compensating coils substantially identical to said sensing coils, disposed beside said sensing coils but in inverted position, said coils being disposed in said recesses, a plate of material having substantially air permeability covering said recesses and flush mounted in said table to provide a continuous smooth surface, said coils being inductively and resistively balanced, a balanced bridge circuit including said coils, said sensing coils being disposed at such distance from the body to be examined that the A.C. response is linearly related to the proximity to said sensing coils of an element of said body under examination, whereby the flux field of said sensing coils is affected in proportion to the proximity of said body to said surface to unbalance the bridge circuit proportionately, said bridge circuit having an output, and indicating means connected to said output to indicate the degree of unbalance and therefore the degree of flatness of said body.

3. An apparatus according to claim 2, wherein said body is a strip of metal and wherein said sensing coils are disposed in a row transversely of said strip, each sensing coil having the associated compensating coil and circuits according to claim 2.

4. An apparatus for determining the deviation from an arbitrary degree of flatness of a body, comprising a table upon which the body to be examined is located, said table having a plurality of recesses, a set of sensing coils having iron cores and means to concentrate the magnetic flux of said coils in one direction, a set of compensating coils substantially identical to said sensing coils disposed beside said sensing coils but in inverted position, said coils being disposed in said recesses, a plate of material having substantially air permeability covering said recesses and flush mounted in said table to provide a continuous smooth surface, said coils being inductively and resistively balanced, a balanced bridge circuit including said coils, said sensing coils being disposed at such distance from the body to be examined that the A.C. response is linearly related to the proximity to said sensing coils of an element of said body under examination, an armature having magnetic permeability disposed to rest lightly on said body over the said sensing coils and to be displaced by elevations or depressions in said body to affect the flux field of the sensing coils to unbalance said bridge circuit proportionately to the proximity of said armature to said sensing coils, said bridge circuit having an output, and indicating means connected to said output to indicate the degree of said unbalance and therefore the degree of flatness of said body.

5. An apparatus according to claim 4, wherein said armature comprises a wheel and means to counterbalance the weight of said armature.

6. An apparatus according to claim 4, wherein said body is a strip of material and wherein said sets of coils are disposed in a row transversely of the strip.

References Cited by the Examiner
UNITED STATES PATENTS

| | | | |
|---|---|---|---|
| 2,116,119 | 5/1938 | Loewenstein | 324—34 |
| 2,155,267 | 4/1939 | Hathaway | 33—147 |
| 2,213,983 | 10/1940 | Gooding | 324—34 X |
| 2,353,211 | 7/1944 | Zuschlag | 324—40 X |
| 2,481,345 | 10/1949 | Reynst | 324—34 X |
| 2,503,720 | 4/1950 | Gieseke | 33—147 X |
| 2,700,132 | 1/1955 | Kuehne | 33—147 X |
| 2,810,880 | 10/1957 | Buccicone | 324—34 |
| 2,834,938 | 5/1958 | Cummingham | 33—174 X |
| 2,935,680 | 5/1960 | Bendix | 324—40 |

FOREIGN PATENTS 451,607   8/1936   Great Britain.

OTHER REFERENCES

General Electric Review, pages 486, 487, November 1939.

ROBERT B. HULL, *Primary Examiner.*

ISAAC LISANN, *Examiner.*

B. DONAHUE, *Assistant Examiner.*